United States Patent [19]

Hargis et al.

[11] Patent Number: 5,543,200
[45] Date of Patent: Aug. 6, 1996

[54] ABRASION-RESISTANT ARTICLE COATED WITH A COATING COMPOSITIONS BASED ON FLUORINATED MONOHYDRIC ALCOHOL

[75] Inventors: I. Glen Hargis, Tallmadge; Russell A. Livigni, Akron; Earl G. Melby, Uniontown; Francis J. Vitus, Tallmadge, all of Ohio

[73] Assignee: GenCorp Inc., Fairlawn, Ohio

[21] Appl. No.: 359,136

[22] Filed: Dec. 19, 1994

[51] Int. Cl.$^6$ ............................. B32B 3/04; B32B 27/40
[52] U.S. Cl. ..................... 428/122; 49/440; 49/475.1; 427/384; 427/393.5; 428/423.1; 428/423.9; 428/424.2; 428/424.8; 528/49; 528/70; 528/76; 528/80; 528/85
[58] Field of Search ................................. 528/49, 70, 76, 528/80, 85; 428/423.1, 423.9, 424.2, 424.8, 122; 49/440, 475.1; 427/384, 393.5

[56] References Cited

U.S. PATENT DOCUMENTS

| | | | |
|---|---|---|---|
| 3,096,344 | 7/1963 | Case | 549/511 |
| 3,347,801 | 10/1967 | Stogryn | 528/402 |
| 4,393,199 | 7/1983 | Manser | 528/409 |
| 4,483,978 | 11/1984 | Masner | 528/408 |
| 4,572,872 | 2/1986 | Yamazaki et al. | 428/423.1 |
| 4,675,452 | 6/1987 | Lagow et al. | 568/601 |
| 4,707,540 | 11/1987 | Manser et al. | 528/417 |
| 4,764,586 | 8/1988 | Manser et al. | 528/362 |
| 4,827,042 | 5/1989 | Lagow et al. | 568/603 |
| 4,847,427 | 7/1989 | Nappa | 568/615 |
| 4,864,040 | 9/1989 | Ohsaka et al. | 549/511 |
| 4,898,981 | 2/1990 | Falk et al. | 568/28 |
| 4,929,666 | 5/1990 | Schmidt et al. | 524/516 |
| 4,946,992 | 8/1990 | Falk et al. | 560/227 |
| 4,970,295 | 11/1990 | Schuchardt | 528/416 |
| 5,000,830 | 3/1991 | Marchionni et al. | 204/157.92 |
| 5,006,624 | 4/1991 | Schmidt et al. | 526/243 |
| 5,097,048 | 3/1992 | Falk et al. | 549/511 |
| 5,115,007 | 5/1992 | Chihara et al. | 524/267 |
| 5,221,707 | 6/1993 | Chihara et al. | 524/267 |

FOREIGN PATENT DOCUMENTS

| | | |
|---|---|---|
| 2100218 | 1/1994 | Canada. |
| 2109966 | 9/1972 | Germany. |
| 4323307A1 | 1/1994 | Germany. |
| 44-20639 | 4/1969 | Japan. |
| 59-157190A | 9/1984 | Japan. |

OTHER PUBLICATIONS

Abstract of Russan Article Titled: "Synthesis of Fluorine--containing derivatives of Oxacyclobutane" Chemical Abstracts: 89:10440p.
A Derwent Patent Search SKU523 yielding abstract #77–55325 by Derwent; McLean, Virginia 1979.
Article by Griffith and Brady in *CHEMTECH*, Jun. 1989, pp. 370–373, published by The American Chemical Society: Washington, D.C.
Article by Griffith in *CHEMTECH*, May 1992, pp. 290–293, published by The American Chemical Society: Washington, D.C.

*Primary Examiner*—D. S. Nakarani
*Attorney, Agent, or Firm*—Robert F. Rywalski; Samuel B. Laferty

[57] ABSTRACT

A urethane coating composition is disclosed which uses fluorinated monohydric alcohols to increase abrasion resistance. One specific use of the coating is on vehicle sealing systems which use elastomeric substrates. The coating composition was found to have dramatically improved abrasion resistance in glass run channel applications over similar coatings without the fluorinated component.

11 Claims, No Drawings

ABRASION-RESISTANT ARTICLE COATED WITH A COATING COMPOSITIONS BASED ON FLUORINATED MONOHYDRIC ALCOHOL

FIELD OF INVENTION

The present invention relates to a primerless, storage stable, quick curing, coating composition which is useful as an abrasion resistant coating, especially useful for elastomeric substrates for sealing applications, and useful as a coating on automotive glass run channel, belt strips, and other seals or gaskets made from elastomers such as ethylene-propylene-diene polymers (EPDM) and blends of EPDM with general purpose diene rubbers such as polybutadiene, styrene-butadiene copolymers, polyisoprene, etc. More specifically the coating is derived from fluorinated alcohols or polyols which results in a coating that resists abrasion and has a reduced coefficient of friction. The preferred glass run channels with the coating of this invention allow automotive windows to move relative to the channel with reduced friction.

BACKGROUND

Prior art coatings used silicone oil to reduce the friction between the channel run and the glass and reduce wear, e.g. U.S. Pat. Nos. 5,115,007 and 5,221,707. It is one object of this invention to reduce or eliminate the need for silicone oil by incorporating fluorinated moieties in the coating composition. The fluorinated moieties of this disclosure result in a coating with abrasion resistance and desirably reduced coefficients of friction. As the EPDM based substrate common to glass run channels is pliable the coating for this application desirably is pliable. The coating composition can be formulated for use with other substrates.

SUMMARY OF THE INVENTION

Disclosed are urethane coating compositions which use as a portion thereof one or more highly fluorinated monohydric alcohols. These highly fluorinated hydroxyl containing materials result in a coating having high abrasion resistance. One disclosed and preferred use of the coating is as an abrasion resistant coating on elastomeric glass run channels. The coating allows the movement of glass through the channel with reduced frictional resistance and reduced wear.

DETAILED DESCRIPTION

Coating compositions yielding surfaces having reduced abrasion and low friction are made from reacting in any sequence a) one or more nonfluorinated polyols with b) one or more fluorinated monohydric alcohols and c) one or more polyisocyanates having an average of 2 or more isocyanate groups per molecule.

The above reaction product may be further reacted with isocyanate blocking agents such as methylethyl ketoxime to block the reactive isocyanate groups until cured at a later time. The blocked isocyanate terminated polymers can then be reacted with amine crosslinking agents such as Jeffamine™ (Texaco) and Polamine™ (Air Products) or otherwise crosslinked to form a cured composition.

The coating compositions are particularly useful for elastomeric substrates such as vehicle suspension bushings, or vehicle sealing systems such as glass run channels, belt strips, or sponge type door gaskets. The abrasion resistance is attributed to the fluorinated alcohol. Desirably 20 percent or more or greater than 50 percent, 75 percent, 80 percent, 90 percent or 100 percent of the total hydrogen and halogen atoms of said one or more fluorinated alcohols are fluorine atoms. Optionally but less desirably, the one or more fluorinated alcohols can have other halogen atoms such as chlorine, iodine or bromine. Desirably, a numerical preponderance of the one or more fluorinated monohydric alcohols have one or more terminal $CF_3$ groups present in their structure.

The monohydric fluorinated alcohols may have from 1 to 30 carbon atoms, desirably from 3 to 20, and may be branched, linear, or cyclic. They may contain aromatic groups but it is desirable that the aromatic groups be free of fluorine substituents. The monohydric alcohols may be polyethers where each ether repeat unit is from 1 to 5 carbon atoms, or they may be monohydric terminated polymers from partially or fully fluorinated monomers. Desirably these monohydric fluorinated alcohols have number average molecular weight below 5,000 and preferably below 2,000. A preferred fluorinated alcohol has the structure

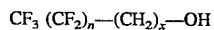

where n can be from 0 to 20 and x can be from 1 to 6, desirably n is from 0 to 14 and x is about 2.

Monohydric fluorinated alcohols are commercially available from DuPont (Zonyl BA-L or Zonyl BA), 3M (L-9704), Ashai Glass, and Hoechst.

Desirably the fluorinated alcohols exclude fluorinated oxetane polymers such as those comprising repeat units of

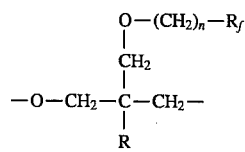

wherein R is H or an alkyl of from 1 to 6 carbon atoms; and $R_f$ individually on each repeat unit is a linear or branched alkyl of 1 to 20 carbon atoms, a minimum of 75 percent of the H atoms of said alkyl being replaced by F and optionally up to all of the remaining H atoms being replaced by I, Cl or Br; or each $R_f$ individually being an oxaperfluorinated polyether having from 4 to 60 carbon atoms, and n is from 1 to 5.

For the purpose of this application, the coating composition is defined as being made from at least one prepolymer which is the reaction product of one or more monohydric fluorinated alcohols, one or more nonfluorinated polyols and polyisocyanates. Said prepolymer is optionally cured with amine crosslinking agents. The prepolymer can desirably be from about 19 to 78 wt. % of polyisocyanates, more desirably from about 30 to 68, and preferably from about 40 to 65 wt. %. Desirably the other 22 to 81 wt. % of the prepolymer, more desirably from about 32 to 70 or 35 to 60 wt. % is comprised of said alcohols and polyols. Alcohols and polyols can be further broken up into monohydric fluorinated alcohols which desirably comprise from about 1 to 60 wt. %, more desirably from about 2 to 40 wt. % and preferably from about 3 to 20 wt. % of said prepolymer; and one or more nonfluorinated polymeric polyols such as polyethers, polyesters and polymers from dienes and/or ethylenically unsaturated monomers which desirably comprise from about 21 to 80 wt. %, more desirably from about 30 to 68 wt. % and preferably from about 40 to 57 wt. %. When the coating is to be applied to an elastomeric substrate, desirably from about 20 to 100 wt. % of the nonfluorinated polymeric polyols are hydrogenated polydienes or poly(butylene-oxide).

The polyisocyanates useful are $R(NCO)_n$ where n is an average from 1.7 to 5 and preferably from 2 to 4 and R is aliphatic, aromatic, or combinations thereof (i.e. partially aromatic and partially aliphatic) having 4 to 100 carbon atoms and preferably from 4 to 20 or 30 carbon atoms. Preferred aromatic diisocyanates include 4,4-methylene diphenyl isocyanate (MDI), as well as modified and polymeric MDI known as Isonates™ or PAPI™ available from Dow Chemical (these are often liquid at room temperature rather than solids), toluene diisocyanate, 1-6-hexane diisocyanate, trimethylhexane diisocyanate, isophorone diisocyanate and the like. Also useful are diisocyanates partially reacted with polyols or polyamines desirably of less than 300 molecular weight to form isocyanate terminated oligomers. Desirably, said polyisocyanates do not include the above-referenced alcohols, polyols, or polyamines which are separate reactants.

The nonfluorinated polyethers and polyesters desirably have number average molecular weights from about 400 to 10,000, more desirably from about 750 to 5,000 and preferably from about 1,000 to 3,000. The polyethers and polyesters are desirably diols but they may be triols, tetrols, and higher functionality polyols. The polyethers include those made from alkalene oxide units having from 1 to 10 carbon atoms and desirably from 2 to 6 carbon atoms in the ring. The polyols may be made from reacting alkalene oxide with strong bases. The polyesters may include polycaprolactone and polyesters from the condensation of one or more dicarboxylic acids and/or their anhydrides having from 2 to 14 carbon atoms, desirably from 2 to 10 carbon atoms, reacted with one or more polyhydric alcohols or alkalene oxides having from 2 to 15 carbon atoms. Suitable polyhydric alcohols include ethylene glycol, 1,2-propylene glycol, pentaerythritol, trimethylolpropane, glycerol monoethyl ether, diethylene glycol, 1,3,5-hexane triol, and the like. Examples of polycarboxylic acids include phthalic acid, isophthalic acid, maleic acid, adipic acid, glutaric acid, sebacic acid, and cyclohexadiene-1,2-dicarboxcylic acid. The corresponding anhydrides or acid chlorides may also be used. Preferred polycarboxylic acids are aliphatic and cycloaliphatic dicarboxylic acids. Any polyhydric alcohol having more than 2 hydroxyl groups or any polycarboxylic acid having more than 2 carboxylic acid groups, desirably is used in only minor amounts, e.g. less than 10 or 5 wt. % based on the weight of the nonfluorinated polyesters to prevent crosslinking and gelling of the polyesters. The other nonfluorinated polymeric polyols include hydroxyl-terminated polymers such as polybutadienes and copolymers of butadiene with other ethylenically unsaturated monomers and liquid hydroxyl-terminated polymers from ethylenically unsaturated monomers free from halogenation.

The hydroxyl-terminated polydienes, e.g. polybutadienes, are especially useful in that they improve primerless adhesion to rubber substrates such as EPDM. It is thought that the non-polar nature of the polydiene especially after hydrogenation gives a compatible material with the EPDM which forms a improved adhesive bond to the EPDM substrate. Other less polar hydroxyl-terminated polyethers may also serve this function as adhesion promoter such as poly(butylene oxide) polyols. The use of the hydrogenated polybutadienes as adhesion promoters as disclosed in U.S. Pat. Nos. 5,115,007 and 5,221,707 which are hereby incorporated by reference for their teachings concerning coating compositions in general and those containing adhesion promoters. These polydienes desirably have 50 percent or more repeat units from conjugated dienes having 4 to 10 carbon atoms. They desirably have hydroxyl termination which is converted to isocyanate termination by reacting with a diisocyanate. They desirably have a number average molecular weight from 500 to 15,000 and a mole ratio of 1,2 vinyl to 1,4 structure in their repeat units from conjugated dienes of from 0.1 to 10. They desirably have from 1.5 to 4.0 hydroxyl groups per polymer.

Another useful material in the coating is nonpolymeric polyols that are free of fluorine. These are nonpolymeric in that they have less than 3 repeat units therein. They include such things as butylene glycol, ethylene glycol, propylene glycol, desirably having from 1 to 20 carbon atoms and optionally oxygen atoms in the background such as diethylene glycol. In a urethane composition, these low molecular weight diols result in a high proportion of hard segments in the polyurethane chain which urethane linkages are polar enough to result in a higher Tg than those made with higher molecular weight polyols. Polyurethane polymers with numerous hard segments therein are known to be more rigid.

Polyamines are incorporated in the principal binder as crosslinking agents to cause crosslinking and curing of the coatings. Optimized crosslink densities can result in improvements in physical property such as abrasion resistance. Effective polyamines include those containing $NH_2$ groups or $NHR_6$ groups where $R_6$ is an alkyl having from 1 to 4 carbon atoms.

Particularly preferred crosslinking agents are aliphatic, primary or secondary, di, tri and tetrafunctional amines having boiling points above 100° C. and preferably above 180° C., including di, tri, and tetrafunctional amines from poly (oxypropylene) or poly (oxy (propylene/ethylene)) such as Jeffamines™ from Texaco having number average molecular weights from less than 200 to greater than 5,000. Included are polyamidoamine resins containing amino end groups sold by Henkel Corp by tradenames Versamid™ or Genamid™; isophoronediamine, mixed trimethylenediamine (TMD), $N,N^1$-diaminoethyl-piperazine, N-aminoethylpiperazine, 1,4-cyclohexanediamine, 1,6-hexanediamine, 1,4-butanediamine, diethylenetriamine, xylylenediamine, ethylenediamine, aromatic di or triamines which are liquid or soluble in the coating composition such as ring methylated phenylenediamine or poly (tetramethylene oxide)-bis(4-aminobenzoates) and the like.

Curing of the polyisocyanate terminated polyols with polyamines generally does not require a catalyst. However, if cure is to be effected with substantial amounts of polyols at low temperatures then urethane catalysts may be used to increase the cure rate. These catalysts are well known to the art and include tin catalysts such as stannous octoate, dioctyltin dilaurate, dibutyltin dilaurate and various tertiary amines. The amounts of these catalysts used can vary from about 0.1 to 5 percent by weight based on the polyurethane forming components.

Curing can be accomplished with atmospheric moisture in lieu of or in addition to polyol or polyamine curing agents.

When it is desired that the prepolymer composition does not cure unless subjected to heat or other activating sources, the unreacted isocyanate groups of the prepolymer are blocked with isocyanate blocking agents. These blocked isocyanates desirably deblock at low temperatures such as from about 80° to 220° C. and desirably from about 80° to 170° C.

Suitable blocking agents include ketoximes, and imidazoles, phenols, lactams, and the like. Another group of blocking agents are various cyclic ureas having from 3 to 12 carbon atoms such as trimethylene or tetramethylene urea. The ketoximes generally have about 3 to about 20 carbon atoms and desirably from about 3 to about 15 carbon atoms and include dimethyl-methylethyl-,diisopropyl-, or dicyclohexylketoxime; benzophenone; and the like, with methylethyl ketoxime being highly preferred. The triazoles and imidazoles generally have a total of from 2 to 10 carbon atoms and include benzotriazole, tolytriazole, phenylimidazole, and the like with benzotriazole being preferred. The phenols having 6 to 20 carbon atoms constitute another class of suitable blocking agents and specific examples of such are well known to the art and to the literature including phenol, nonylphenol, and the like. The lactams generally contain a total of from about 3 or 4 to 12 carbon atoms and are also well known to the art and to the literature with specific examples including epsilon-caprolactam, lauryl lactam, and the like. Other classes of deblocking agents include the various amines. The amount of blocking agent should be sufficient to create an equivalent ratio of blocking agent/NCO greater than 1, and preferably not above 1.2. Preferred blocking agents include ketoximes, caprolactam, phenols, and triazoles.

Coating compositions containing the fluorinated alcohols have abrasion resistance and at optimum concentrations may have low coefficients of friction. Desirably these coatings have lesser amounts of silicone oil and more desirably are essentially free of silicone oil (i.e. less than 0.5 wt. % silicone oil based on the polymeric binders of the coating or less than 0.1 wt. %). The reduced amount of silicone oil or absence of silicone oil is one major difference from prior art glass run channel coatings. Silicone oils which tend to be insoluble in coatings for EPDM are known to bloom to the surfaces of coatings and from there are physically transferred to nearby surfaces where they interfere with subsequent painting or finishing operations. Silicone oils are defined as liquid or fluid silicone polymers either as free polymers or attached to other components having a silicone backbone structure comprising alternate silicon and oxygen atoms with the general structure

$$-(SiR^1R^2-O)_n$$

where $R^1$ and $R^2$ are independently an alkyl group of 1 to 20 carbon atoms or aromatic group of 6 to 20 atoms and n is from 2 to 5,000. Silicone oils may also contain repeat units of fluoroalkyl as well as units containing chlorine, alkoxy, and other substituents as long as the repeat units are predominantly silicone repeat units (i.e greater than 50 mole percent).

The coating composition may include various low friction polymers which are used to impart abrasion resistance. Such polymers may be used in combination with the fluorinated alcohols. Simple friction reducing polymers generally having suitable abrasion resistant properties include the various nylons, that is polyamides, such as nylon 6, nylon 66, nylon 610, and the like, with nylon 11 being preferred. Generally any fluorinated polymer including fluorinated block and/or graft copolymers can be utilized wherein the repeat units contain one or more fluorine units with specific examples including poly(vinyl fluoride), poly(vinylidene fluoride), copolymers of vinylidene fluoride-hexafluoro propylene, polychloro trifluoro ethylene, copolymers of chlorotrifluoro ethylene and vinylidene fluoride, and the like, with poly(tetrafluoro ethylene) being highly preferred. Fluorinated ethylene propylene, perfluoro alkoxy polymers, ethylene trifluoroethylene copolymers, and ethylene-tetrafluoroethylene copolymers can also be used. Other friction reducing polymers include polyethylene, polypropylene, and the like.

The above friction-reducing polymers generally have a number average molecular weight of at least 500 and desirably at least 1,000. Desirably excluded from the friction reducing polymers are oxetane polymers with pendant fluorinated side chains similar to the fluorinated alcohols and polyols of this application.

The coating composition may include powder, micropowders, dispersions of silica, molybdenum disulfide, glass beads, and the like. Solvents may be included such as xylene, toluene, N,N-dimethyl formamide, N-methyl pyrolidine, tetrahydrofuran, ethers, etc., which are used to control the viscosity of the coating or for other viscosity related purposes. Pigments may be included such as carbon black, titanium dioxide, opacifying agents or coloring agents may be used. Agents to resist degradation in the use environment may also be added. Such agents include antifungal agents, UV resistors, ozone resistors, and antioxidants.

The coating composition of this invention may be applied over a temperature range from below ambient, approximately 20° C., to above 200° C., and may be applied to a variety of substrates such as elastomers, plastics, metals, woods, and other structural materials. Elastomers are defined herein as polymers capable of reversible elongation of at least 10, 20, 50, or 100 percent. EPDM is defined herein as an elastomer comprised of monomers selected from ethylene, propylene, and one or more nonconjugated dienes. Preferred substrates are elastomers such as EPDM which is often used in glass run channels.

The coating composition may be applied by known methods such as dipping, wiping, rolling, spraying, coextrusion, etc. The coating may be applied in the extrusion die for elastomers such as EPDM, this is known as in-die coating. Or the coating may be applied subsequent to extrusion as a hot melt before or after cure of the EPDM or other substrate. Solventless methods are desirable to reduce volatile organic emissions into the environment. When applied as a coating (e.g. on EPDM glass run channel) the coating as applied desirably has all of its isocyanate groups blocked. Desirably, the coating using blocked isocyanates cures in a few minutes at temperatures from above 120° C. and preferably from 170° C. to 230° C. by a process where the isocyanate groups are de-blocked and subsequently reacted to cure the composition. When applied to EPDM, the coating may be applied either before, concurrently with, or after vulcanization of the EPDM substrate. Desirably, cured coating thicknesses are from about 1 or 2 microns to about 100 or 200 microns, and more preferably from about 15 to 60 microns.

The coating compositions of this invention are useful as highly abrasion resistance coatings with reduced friction for vehicle suspension bushings or vehicle sealing systems such as glass run channels, belt strips, weather stripping, sponge-type door gaskets. They may also be used on windshield wipers, engine mounts, luggage, boats, ships, barges, household goods, paints, plastics, metals, fibers, woods, fabrics, industrial equipment, and household or commercial equipment. A preferred use is as a coating on glass run channels where the coating on the surface contacting the glass needs to have low friction and be abrasion resistant. A common feature to glass run channels is two laterally spaced side members molded integrally to define a channel. The surfaces of these laterally spaced members which contact the glass during the operation of the window glass are desirably coated with the abrasion resistant coating. Other surfaces of the glass run channel may also be coated.

The following examples show urethane coating compositions with and without fluorinated alcohols and their performance as low friction coatings.

EXAMPLE 1

Blocked Urethane Prepolymers

A. Prepolymer of MDI/Hydrogenated Atochem™ R45HT, Blocked with Methyl Ethyl Ketoxime.

Into a clean, dry, 3 liter, 3 necked reaction flask equipped with argon inlet, stirrer, thermocouple, condenser and outlet bubbler was charged:

1. MDI, (Mondur™ M) 4,4'-diphenylmethane diisocyanate, 55.0 grams at 8.0 meq NCO/gram to give 440 milliequivalents NCO.
2. Toluene, dried through 5 Å molecular sieves, 492.57 grams.

The contents were heated to 110° C., the reflux temperature of toluene. A slightly turbid solution was observed. Samples of this solution were taken and the isocyanate content determined by standard method using dibutylamine as reactant and bromophenol blue as indicator. The isocyanate content was found equal to 0.924 meq NCO/gram solution.

3. The following second solution was prepared for addition to the isocyanate containing solution. The second solution was made at 10 percent by weight excess to allow for holdover during transfer. Hydrogenated Atochem™ (hydrogenated polybutadiene polyol (R45HT)) (363.66 g) as a solution in toluene at 61.2 percent solids was diluted with 1119.8 grams toluene. The second solution was heated in a closed can to 80° C. and mixed to homogenize.

4. Over two hours, 1348.6 grams of this second solution was added to the isocyanate containing solution which was kept at 110° C. and vigorously stirred throughout addition. The added solution contained 1281.1 grams toluene and 202.3 grams hydrogenated Atochem™ R45HT at 0.87 meq OH/gram to give 176.1 meq OH. The molar ratio of NCO/OH was 2.5. The reaction was kept at 110° C. for two hours after the end of addition. After this time, isocyanate content was determined. NCO content was 0.0897 meq/gram solution, or 64 percent of theoretical 0.139 meq/gram. Infrared analysis of the reactor contents revealed an absorbance at 2250 cm$^{-1}$ indicating the presence of isocyanate.

5. The amount of methyl ethyl ketoxime (MEKO) needed to block the residual isocyanate was calculated and 15.56 grams MEKO was added. This was 5 percent excess over calculated residual equivalents of NCO after reaction with OH. The solution was refluxed at 110° C. overnight. In the morning, the sample taken showed no residual NCO by infrared. The contents were cooled to 60° C. and transferred to a can and sealed for future use in coating evaluations.

B. Prepolymer of MDI/PPG 2025 Blocked with Methyl Ethyl Ketoxime.

Into a clean, dry, 1 liter resin kettle equipped with argon inlet, stirrer, condenser and outlet bubbler was charged the following ingredients:

1. MDI, (Mondur™ M) 4,4'-diphenylmethane diisocyanate, 24.96 grams @ 8 meq/gram to give 199.68 meq NCO.
2. Toluene, dried through 5 Å molecular sieves, 588.0 grams.
3. DABCO™T-9 stannous octoate (Air Products), 0.19 grams.

The vessel contents were heated with stirring to 110° C., toluene reflux temperature, to give a slightly opaque solution.

4. To the stirring isocyanate solution, vacuum-oven dried PPG 2025 polypropylene glycol of nominal molecular weight 2000, was added dropwise over 1 hour, 55 minutes. The contents were stirred at 110° C. for two hours after addition was complete. The contents were allowed to cool overnight. In the morning, the contents were heated to 100° C. and sampled for infrared analysis and isocyanate content by dibutylamine titration. The NCO content was found to be 0.1275 meq NCO/gram of solution. This was 73.83 percent of theoretical based upon completely pure MDI and no impurities in the system. The infrared spectrum showed absorbance at 2250 cm$^{-1}$, indicating NCO was present.

5. The amount of methyl ethyl ketoxime (MEKO) needed to block the residual NCO was calculated from the determined NCO and materials balance. MEKO (7.30 grams) was added (3.6 percent excess) and the blocking reaction was allowed to occur at 110° C. for two hours. A sample was taken and the infrared spectrum showed no absorbance at 2250 cm$^{-1}$. The blocking reaction was complete. The contents were cooled with stirring to 40° C. and transferred to a pre-weighed can until used in coatings evaluation. 595.9 grams of product were recovered.

Prepolymer of MDI/Polybutylene Oxide, Blocked with Methyl Ethyl Ketoxime.

1. A 1000 ml glass reactor kettle equipped with a temperature probe, reflux condenser, and a port for the addition of ingredients was purged with nitrogen gas for 20 minutes.
2. To the reactor was added 22.5 g (166.5 meq NCO) of MDI and 303.4 g of toluene and the temperature of the mixture was raised to 100° C.
3. Two drops (0.05 g) of DABCO™T-9 catalyst were added.
4. A separate solution containing 59.46 g butylene oxide (BO) polyol (XAS 10961.00, mol. wt. 2000, Dow Chemical Co.) and 50.58 g of toluene was prepared and added to the reaction vessel continuously over a period of about 3 hours and 40 minutes. The NCO/OH mole ratio was 2.5/1. The reaction was allowed to continue for about 2 more hours and a sample (11.27 g) was withdrawn for analysis.
5. A total of 9.58 g of MEKO blocking agent was then added to the reactor followed by the addition of 25.0 g of toluene. After all of the unreacted NCO had been blocked with MEKO, the reactants were cooled to room temperature and stored in a closed container.

The solids content of the prepolymer was determined gravimetrically and was found to be 19.44 percent.

D. Preparation of Isonate 2191/Fluorinated-Alcohol/PPG 2025 Blocked with Methyl Ethyl Ketoxime.

Into a 1 liter, clean, dry resin kettle equipped with argon inlet, stirrer, condenser and outlet bubbler was added the following:

1. Isonate™ 2191, Dow Chemical Co. polymeric MDI (4,4'-diphenylmethane diisocyanate), 80.15 grams @ 6.928 meq NCO/gram to give 555.28 meq NCO.
2. Toluene, dried through 5 Å molecular sieves, 544.6 grams.
3. DABCO™ T-9, stannous octoate, 0.21 grams.

The contents were heated under argon purge to 82° C. An orange clear solution was observed.

4. The fluorinated alcohol (L-9704 3M Co. 1,1-dihydroheptafluorobutanol, 9.34 grams @ 4.999 meq OH/gram to give 46.69 meq OH) was added to the stirring kettle contents over 20 minutes. The reaction was allowed to progress at 76°–81° C. for two hours, 25 minutes.

5. PPG 2025, polypropylene glycol, 37.08 grams @ 1.087 meq OH/gram to give 40.31 meq OH, was added dropwise over 1 hour and 30 minutes, then it was reacted for 2 additional hours. The reaction temperature was kept between 78°–82° C. The solution was allowed to cool with stirring overnight. An orange solution which was easily stirred at 25° C. resulted.

The contents were reheated and a sample was taken for infrared analysis and NCO determination. The NCO content was found to be 0.392 meq NCO/gram solution versus 0.428 meq/gram theoretical or 91.6 percent of theoretical.

6. Based upon NCO determination and material balance, the amount of MEKO needed was calculated. 27.14 grams of MEKO (4.67 percent excess) was added. An instantaneous exotherm to 90° C. was seen. The blocking reaction was done over 4 hours at 78°–82° C. The sample revealed no absorbance at 2250 $cm^{-1}$, indicating complete blocking. The contents were allowed to cool to 35° C. and were transferred to a can and capped pending evaluation in coatings.

E. Preparation of Isonate 2191/Fluorinated Alcohol/Polybutylene Oxide Blocked with Methyl Ethyl Ketoxime.

Into a 1 liter, clean, dry resin kettle equipped with argon inlet, stirrer, condenser and outlet bubbler was added the following:

1. Isonate™ 2191, Dow Chemical Co. polymeric MDI (4,4'-diphenylmethane diisocyanate), 74.98 grams @ 6.928 meq NCO/gram to give 519.46 meq NCO.
2. Toluene, dried through 5 Å molecular sieves, 659.0 grams.
3. DABCO™ T-9, stannous octoate, 0.46 grams.

The contents were heated under an argon purge to 80° C. An orange clear solution resulted.

4. The fluorinated alcohol (L-9704 3M Co. 1,1-dihydroheptafluorobutanol, 11.76 grams @ 4.999 meq OH/gram to give 58.78 meq OH) was added to the stirring kettle contents over 20 minutes. The kettle contents during addition were at 80° C. The reaction was allowed to progress for 2 hours and 45 minutes at 78°–80° C.
5. Polybutylene oxide, Dow Chem. Co. XAS 10961.00, Experimental Diol, 47.79 grams @ 1.018 meq OH/gram to give 48.65 meq OH, was added dropwise over 1 hour, 30 minutes. Temperature during addition was 78° C. The reaction was allowed to continue at 80° C. for an additional 2 hours, then allowed to cool overnight. Argon atmosphere was maintained. An orange, clear, easily stirable solution resulted.

The contents were reheated and a sample was taken for infrared analysis and NCO determination. The infrared spectrum showed strong absorbance at 2260 $cm^{-1}$, indicating NCO. The NCO content was determined to be 0.486 meq NCO/gram of solution versus 0.519 meq/gram theoretical or 93.73 percent.

6. Based upon NCO determination and material balance, the amount of MEKO blocking agent needed was calculated. 34.18 grams of MEKO (4.53 percent excess) was added. An immediate exotherm from 80° C. to 83° C. occurred. The blocking reaction was continued for 30 minutes at 82° C. and the reaction contents sampled. Infrared results showed no absorbance at 2260 $cm^{-1}$, indicating complete blocking. The contents were cooled to 40° C. and transferred to a can and sealed pending evaluation in coatings.

EXAMPLE 2

Coatings on Cured EPDM: Comparative Examples

Freshly prepared and cured EPDM stock was used. The EPDM surface to be coated was wiped with toluene, allowed to air-dry, then wiped a second time with acetone. The wipes were done to eliminate any impurities on the surface either adventitious or from "bloom". When dry, the rubber was mounted vertically and then was sprayed with the coating using an air gun with an aspirator tube. Twenty psi (0.139 MPa) air pressure was used. A known weight of coating was sprayed as a solution in toluene, allowed to dry for several minutes, and then placed into a 200° C. oven for 10 minutes. The coated EPDM was allowed to stand overnight and the coating was then tested using the crockmeter abrasion tester.

A. Coating of MDI/Hydrogenated Atochem™ R45HT/MEKO 15.0 grams of Block Urethane Prepolymer A at 15.26 percent solids was diluted with 30 grams of toluene and 0.342 grams Jeffamine™ T-403 at 6.1 meq NH/gram was added to give 2.086 meq NH. The amount of NCO after unblocking which was available during cure was 1.346 meq based upon pre-blocked NCO content. The ratio of [NH]/[NCO] was 1.55. All of the solution was sprayed onto a 3"×8" ( 7.6×20.3 cm) size sheet of EPDM. The grams of solids were calculated as 2.289 grams of MDI/Hydrogenated Atochem™ R45HT. The normalized weight for a full sheet of EPDM (15.2×20.3 cm) was 4.58 grams.

B. Coating Blend of MDI/PPG 2025/MEKO with MDI/Hydrogenated Atochem™ R45HT/MEKO 14.99 grams of Blocked Urethane Prepolymer B at 15.39 percent solids was charged to a beaker. 15.07 grams of Blocked Urethane Prepolymer A at 15.26 percent solids was added. 0.426 grams of Jeffamine™ T-403 was added, followed by 33.55 grams of toluene. The contents were covered and mixed well. 34.14 grams of this solution was sprayed onto a 7.6×20.3 cm size sheet of EPDM. The amount of NH from Jeffamine™ T-403 was 3.904 meq. The amount of NCO available after unblocking was 1.92 meq from Blocked Urethane Prepolymer B plus 1.35 meq from Blocked Urethane Prepolymer A which totaled to 3.27 meq NCO. The ratio of [NH]/[NCO] was 1.19. The normalized weight of solids sprayed for a full sheet of EPDM (15.2×20.3 cm) was 4.89 grams of which 49.78 percent was MDI/Hydrogenated Atochem™ R45HT and 50.22 percent was MDI/PPG 2025.

C. Coating Blend of Isonate™ 2191/Fluorinated Alcohol/PPG 2025/MEKO with MDI/Hydrogenated Atochem™ R45HT/MEKO.

12.03 grams of Blocked Urethane Prepolymer D at 16.62 percent solids was charged to a beaker. 13.11 grams of Blocked Urethane Prepolymer A at 15.26 percent solids was added. 1.16 grams of Jeffamine™ T-403 was added, followed by 30 grams toluene. The contents were mixed well. This entire solution was sprayed onto a 7.6×20.3 cm size sheet of EPDM. The amount of NH from Jeffamine™ T-403 was 7.076 meq. The amount of NCO available after unblocking was 5.90 meq. The ratio of [NH]/[NCO] was 1.20. The normalized weight of solids sprayed for a full sheet of EPDM was 4.00 grams of which 50 percent was MDI/Hydrogenated Atochem™ R45HT and 50 percent was Isonate™ 2191/Fluorinated alcohol/PPG 2025.

D. Coating Blend of Isonate 2191/Fluorinated Alcohol/Polybutylene Oxide/MEKO with MDI/Hydrogenated Atochem™ R45HT/MEKO.

12.25 grams of Blocked Urethane Prepolymer E at 16.33 percent solids was charged to a beaker. 13.11 grams of Blocked Urethane Prepolymer A at 16.62 percent solids was added. 1.31 grams of Jeffamine™ T-403 was added, followed by 30 grams of toluene. The contents were mixed well. This entire solution was sprayed onto a 7.6×20.3 cm size sheet of EPDM. The amount of NH from Jeffamine™ T-403 was 7.99 meq. The amount of NCO available after unblocking was 7.13 meq. The ratio of [NH]/[NCO] was 1.12. The weight of solids sprayed was 4.00 grams of which 50 percent was MDI/Hydrogenated Atochem™ R45HT and 50 percent was Isonate™ 2191/Fluorinated alcohol/Polybutylene oxide.

E. For comparison purposes, EPDM with no coating was also examined on the crockmeter. Much abraded rubber was observed, even in the first few cycles. The test was discontinued after only 60 cycles. The voltage measured during the test was 1.95.

EXAMPLE 3

Comparative Crockmeter Test Results For Coatings on EPDM

The modified crockmeter abrasion tester used here consists of a rounded sliding glass edge under a vertical load, of 2.729 Kg. The glass slides upon the coating at approximately 1 cycle/second. The glass surface is cleaned every 5000 cycles with 3M Co. Blue Grit Utility Cloth J wt. #280. The crockmeter was equipped with a sensor to measure the force required to slide. The running voltages and corresponding number of rub cycles to failure were recorded by computer. The cycles per micron thickness was calculated from measurements of initial coating thickness and coating thickness after the test as determined with an optical microscope. The coating compositions and comparative results are given in the attached table. When noticeable black rubber wear was observed indicating depletion of the coating, the number of cycles was recorded.

TABLE I

| | CROCKMETER RESULTS FOR EXPERIMENTAL COATINGS | | |
|---|---|---|---|
| COATING | PREPOLYMER COMPOSITION * | CYCLES TO FAILURE | CYCLES PER μm, THICKNESS |
| E(1) | NO COATING | <60 | N/A |
| E(2) | NO COATING | <60 | N/A |
| B(1) | MDI/PPG 2025: MDI/HYDROGENATED ATOCHEM R45HT | 2,606 | 65 |
| B(2) | MDI/PPG 2025: MDI/HYDROGENATED ATOCHEM R45HT | 2,525 | 68 |
| A(1) | MDI/HYDROGENATED ATOCREM R45HT | 2,045 | 64 |
| A(2) | MDI/HYDROGENATED ATOCHEM R45HT | 3,100 | 89 |
| C(1) | ISONATE 2191/Fl-ALCOHOL/PPG 2025: MDI/HYDROGENATED ATOCHEM R45HT | 5,062 | 211 |
| C(2) | ISONATE 2191/Fl-ALCOHOL/PPG 2025: MDI/HYDROGENATED ATOCHEM R45HT | 35,002 | 1,642 |
| D(1) | ISONATE 2191/Fl-ALCOHOL/POLY BO: MDI/HYDROGENATED ATOCHEM R45HT | 8,683 | 459 |
| D(2) | ISONATE 2191/Fl-ALCOHOL/ POLY BO: MDI/HYDROGENATED ATOCHEM R45HT | 7,596 | 373 |

*Curing agent is Jeffamine

While in accordance with the Patent Statutes, a preferred embodiment and best mode have been presented, the scope of the invention is not limited thereto, but rather is measured by the scope of the attached claims.

What is claimed is:

1. A laminate comprising a cured coating composition on a substrate, said coating composition being the reaction product of a reaction mixture comprising;
    (a) a fluorinated monohydric alcohol other than fluorinated poly(oxetane), wherein at least 20 percent of the total hydrogen and halogen atoms of said fluorinated monohydric alcohol are fluorine atoms,
    (b) a nonfluorinated polyol, wherein said nonfluorinated polyol is a polyether, a polyester, or a hydrogenated polydiene polyol or a combination thereof; and
    (c) a polyisocyanate of the formula $R(NCO)_n$ where n is an integer from 2 to 5 and R has from 4 to 100 carbon atoms and R is not a polyether or a polyester, wherein the ratio of isocyanate groups to hydroxyl groups in said reaction mixture is from 1:1 to 50:1.

2. A laminate according to claim 1 wherein said fluorinated monohydric alcohol is from 1 to 60 wt. percent, said nonfluorinated polyol is from 21 to 80 wt. percent; and said polyisocyanate is from 19 to 78 wt. percent of said reaction product of a, b, and c.

3. A laminate according to claim 2, wherein said substrate is an elastomer and wherein at least 50 mole % of the total halogen and hydrogen atoms of said fluorinated monohydric alcohol are fluorine atoms.

4. A laminate according to claim 3, wherein said laminate is a component in a vehicle sealing system or vehicular suspension bushing.

5. A laminate according to claim 3, wherein the substrate is a glass run channel comprising two laterally spaced side members molded integrally to define a channel.

6. A laminate according to claim 3, wherein said fluorinated monohydric alcohol is one or more monohydric aliphatic fluorinated alcohols.

7. A laminate according to claim 6, wherein said fluorinated monohydric alcohol has the structure

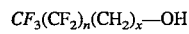

where n is from 0 to 20 and x is from 1 to 6.

8. A laminate according to claim 3, wherein said fluorinated monohydric alcohol consists essentially of one or more fluorinated polyether monohydric polyols having 1 to 5 carbon atoms per repeat unit.

9. In a laminated article comprising a shaped elastomeric substrate and a cured abrasion resistant urethane coating thereon, the improvement wherein the urethane coating prior to curing comprises 1 to 60 wt. percent of a fluorinated monohydric alcohol based on the dried coating weight, said monohydric alcohol being other than fluorinated poly(oxetane)s and having at least 20 percent fluorine atoms based on the total hydrogen and halogen atoms of said fluorinated alcohol.

10. In a laminated article according to claim 9, wherein said shaped elastomeric substrate is a vehicle sealing device and said fluorinated alcohol consists essentially of one or more monohydric aliphatic fluorinated alcohols having at least 50 percent fluorine atoms based on the total hydrogen and halogen atoms of said fluorinated aliphatic alcohols.

11. In a method for using a monohydric alcohol in a urethane coating composition, said urethane coating composition comprising a monohydric alcohol reacted with a polyisocyanate and a nonfluorinated polyol reacted with a polyisocyanate, the improvement wherein the monohydric alcohol comprises a fluorinated monohydric alcohol other than fluorinated poly(oxetane)s in an amount from 1 to 60 wt. percent of said coating compositions, wherein at least 20 percent of the total hydrogen and halogen atoms of said fluorinated monohydric alcohol are fluorine atoms and wherein said urethane coating composition is applied as a coating to an elastomeric glass run channel and subsequently cured.

* * * * *